(12) United States Patent
Li

(10) Patent No.: US 11,063,395 B2
(45) Date of Patent: Jul. 13, 2021

(54) SIGNAL PROTECTION DEVICE AND CABLE CONNECTOR

(71) Applicant: CABLESAT INTERNATIONAL CO., LTD., Taichung (TW)

(72) Inventor: Ching-Chieh Li, Taichung (TW)

(73) Assignee: CABLESAT INTERNATIONAL CO., LTD., Taichung (TW)

( * ) Notice: Subject to any disclaimer, the term of this patent is extended or adjusted under 35 U.S.C. 154(b) by 0 days.

(21) Appl. No.: 16/990,258

(22) Filed: Aug. 11, 2020

(65) Prior Publication Data

US 2021/0066867 A1    Mar. 4, 2021

(30) Foreign Application Priority Data

Aug. 28, 2019   (TW) .................................. 108130873

(51) Int. Cl.
*H01R 24/48*   (2011.01)
*H01R 24/50*   (2011.01)

(52) U.S. Cl.
CPC ............. *H01R 24/48* (2013.01); *H01R 24/50* (2013.01)

(58) Field of Classification Search
CPC ........ H01R 24/48; H01R 24/50; H01R 13/66; H01R 31/065; H04B 15/00
See application file for complete search history.

(56) References Cited

U.S. PATENT DOCUMENTS

| 8,272,876 B2* | 9/2012 | Schultz | H05K 1/0233 439/38 |
| 10,665,434 B2* | 5/2020 | Matsumoto | H01R 39/381 |
| 10,905,871 B2* | 2/2021 | Nageri | A61N 1/0553 |

FOREIGN PATENT DOCUMENTS

TW           M553048 U    12/2017

* cited by examiner

*Primary Examiner* — Jean F Duverne
(74) *Attorney, Agent, or Firm* — Birch, Stewart, Kolasch & Birch, LLP

(57) ABSTRACT

A cable connector disposed at a cable includes a signal protection device, an outer pipe and a transmission member. The signal protection device includes an inner pipe and a signal protection module. The inner pipe is inserted into the outer pipe through an end opening thereof such that a metallic conducting rod of the inner pipe is in the outer pipe. The signal protection module is inserted through another end opening of the outer pipe such that the metallic conducting rod of the inner pipe is penetratingly disposed at the signal protection module. The transmission member is inserted through another end opening of the outer pipe such that a conducting element is electrically connected to the metallic conducting rod of the inner pipe, revealing a transmission element. Therefore, the signal protection device is modularized and miniaturized.

18 Claims, 7 Drawing Sheets

SIGNAL PROTECTION DEVICE AND CABLE CONNECTOR

FIELD OF THE INVENTION

The present disclosure relates to signal protection technology and, more particularly, to a signal protection device disposed at a cable and a cable connector using the signal protection device.

BACKGROUND OF THE INVENTION

Electronic communication devices/components have wide applications in modern life. For example, signal devices receive TV signals. However, under the influence of external or internal electric power, signal interference occurs while signal exchange is taking place in the circuits of the electronic communication devices/components. Therefore, there is a need to design a way of effectively blocking out external noise or interference caused by instability of electric power.

There are a variety of ways of blocking out external noise or electrical influence. A common one involves mounting a passive component, such as a capacitor component or an inductor component, in a device; for example, Taiwan patent M553048 discloses a capacitor module for a communication component, comprising an inner electrode spacer 11, a capacitor 12, an outer electrode spacer 13 and an insulating glue 14. The inner electrode spacer 11 has a base 111, a conical protuberance 112 integrally extending from a lateral surface of the base 111, and a penetrating hole 115 penetrating two lateral surfaces of the base 111. The capacitor 12 has a via 121 which the conical protuberance 112 of the inner electrode spacer 11 penetratingly fits to. The outer electrode spacer 13 receives the inner electrode spacer 11 and the capacitor 12. The outer electrode spacer 13 has a through hole 131 and has an abutting ring portion 132; hence, the capacitor 12 is confined to between the abutting ring portion 132 of the outer electrode spacer 13 and the base 111 of the inner electrode spacer 11. The insulating glue 14 is applied to between the inner electrode spacer 11, the capacitor 12 and the outer electrode spacer 13 such that the capacitor 12 is firmly fixed into the inner electrode spacer 11 and the outer electrode spacer 13, so as to form a modularized capacitor module 1.

To incorporate the capacitor module 1 into a device, such as a coaxial cable or an amplifier, such that the capacitor module 1 blocks out external noise, it is feasible for one said capacitor module 1 to be series-connected to an iron core component 3 and then fitted inside an outer casing 4. Although the capacitor module 1 attains simplification of parts and components and modularization, fitting the capacitor modules 1 into the outer casing 4 entails fitting sequentially thereto the iron core components 3, respectively, and in consequence the capacity of the outer casing 4 places a limitation on the performance of the device in terms of noise blocking.

Therefore, it is imperative to not only make good use of the capacity of the outer casing 4 but also enhance noise blocking.

SUMMARY OF THE INVENTION

To overcome the aforesaid drawback of the prior art, it is an objective of the present disclosure to provide a signal protection device disposed at a cable, modularized, miniaturized, designed to have dual protection mechanisms, and customized, so as to effectively suppress interference, such as external noise and high-voltage surges.

In order to achieve the above and other objectives, the present disclosure provides a signal protection device, comprising an inner pipe and a signal protection module.

The inner pipe has a first end, a second end opposing the first end and having a closed surface, and an outer thread segment disposed on an outer wall of the inner pipe and positioned proximate to the first end. The center and the rim of the closed surface of the second end of the inner pipe extend to form a metallic conducting rod.

The signal protection module comprises a tubular blocker, a ring inductor, at least one capacitor, a fitting element and a conducting element. The ring inductor, the fitting element and the conducting element each fit around the metallic conducting rod of the inner pipe.

The inner wall of the tubular blocker has a plurality of radially, concavely disposed engaging portions for snap-engaging with the inner pipe.

The fitting element has a penetrating hole and at least one fitting hole. The penetrating hole fits around the metallic conducting rod of the inner pipe. The at least one fitting hole is in communication with the penetrating hole and the metallic conducting rod of the inner pipe. The at least one capacitor is receivedly disposed in the at least one fitting hole of the fitting element and electrically connected to the metallic conducting rod of the inner pipe.

The conducting element is a metallic conducting ring disposed between one side of the ring inductor and the fitting element. The conducting element has a penetrating hole disposed therein and corresponding in position to the penetrating hole of the fitting element. The conducting element has at least one pressing plate extending therefrom and at least one conducting plate extending therefrom. The at least one pressing plate of the conducting element presses against another side of the at least one capacitor receivedly disposed in the at least one fitting hole of the fitting element such that the ring inductor electrically connected to the conducting element.

The present disclosure further provides a cable connector comprising the signal protection device and an outer pipe. The signal protection device is fitted inside the outer pipe.

Preferably, the cable connector further comprises a transmission module fitted inside the outer pipe and electrically connected to the other side of the ring inductor of the signal protection module of the signal protection device.

DETAILED DESCRIPTION OF THE PREFERRED EMBODIMENTS

Figure 1:
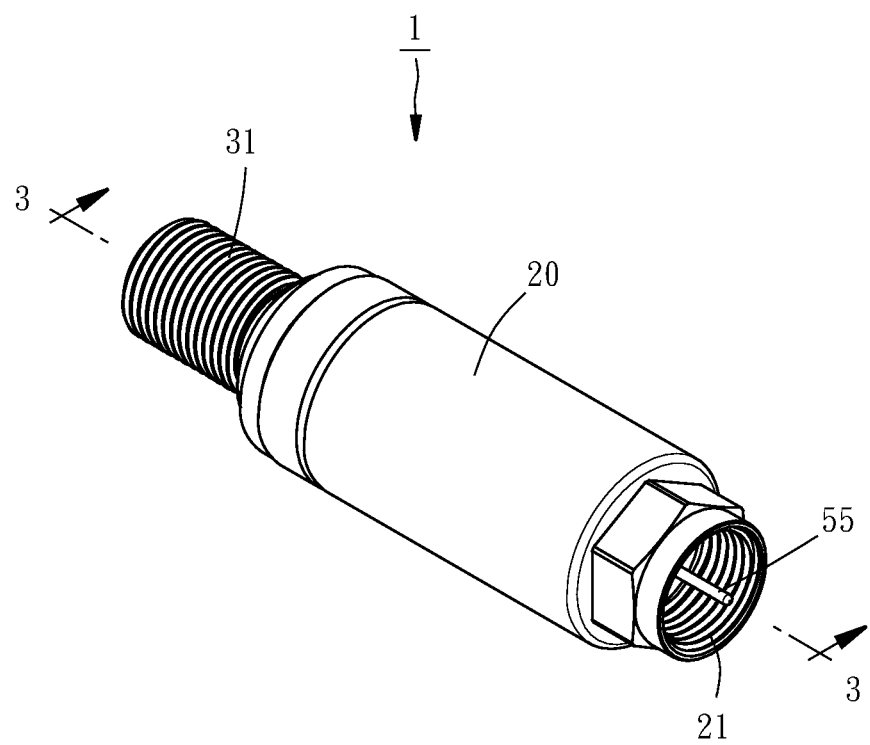
FIG. 1 is a perspective view of the first preferred embodiment of the present disclosure.

Preferred embodiments described below and accompanying diagrams are intended to illustrate the technical solutions and features of the present disclosure. Directional words, such as "on", "under", "left", "right", "in", "outside", "top" and "bottom", serve descriptive purposes in accordance with directions of normal use only but are not intended to be restrictive of the claims of the present disclosure. Ordinal numbers, such as "first", "second", "third" and "fourth," used herein are intended to serve descriptive purposes and distinguish components but are not intended to be restrictive of the technical features and claims of the present disclosure.

Referring to FIG. 1 through FIG. 4, the first preferred embodiment of the present disclosure provides a signal protection device 10 disposed at a cable and a cable connector 1 using the signal protection device 10. The cable connector 1 comprises a signal protection device 10, an outer pipe 20 and a transmission member 50. The signal protection device 10 comprises an inner pipe 30 and a signal protection module 40.

The inner wall at one end of the outer pipe 20 has an inner thread segment 21. A first receiving portion 23 and a second receiving portion 25 are radially, concavely disposed at the inner wall at the other end of the outer pipe 20. The first receiving portion 23 has a plurality of engaging segments 231 radially extending and spaced apart. The first receiving portion 23 has a greater radial dimension than the second receiving portion 25, thereby forming a shoulder portion 24. The outer pipe 20 tapers from the second receiving portion 25 to the inner thread segment 21 to form a limiting portion 26 which tapers.

The inner pipe 30 has a first end 301, a second end 302 opposing the first end 301 and being a closed surface, and an outer thread segment 31 disposed on the outer wall of the inner pipe 30 and positioned proximate to the first end 301. A plurality of radially elevated tooth portions 33 is disposed on the outer wall of the inner pipe 30 and positioned proximate to the second end 302. The tooth portions 33 are spaced apart. The center and the rim of the closed surface of the second end 302 of the inner pipe 30 extend to form a metallic conducting rod 35 and an annular wall 37, respectively. A snap-engagement portion 351 is radially, concavely formed around the metallic conducting rod 35 and positioned proximate to the free end of the metallic conducting rod 35.

Figure 2:
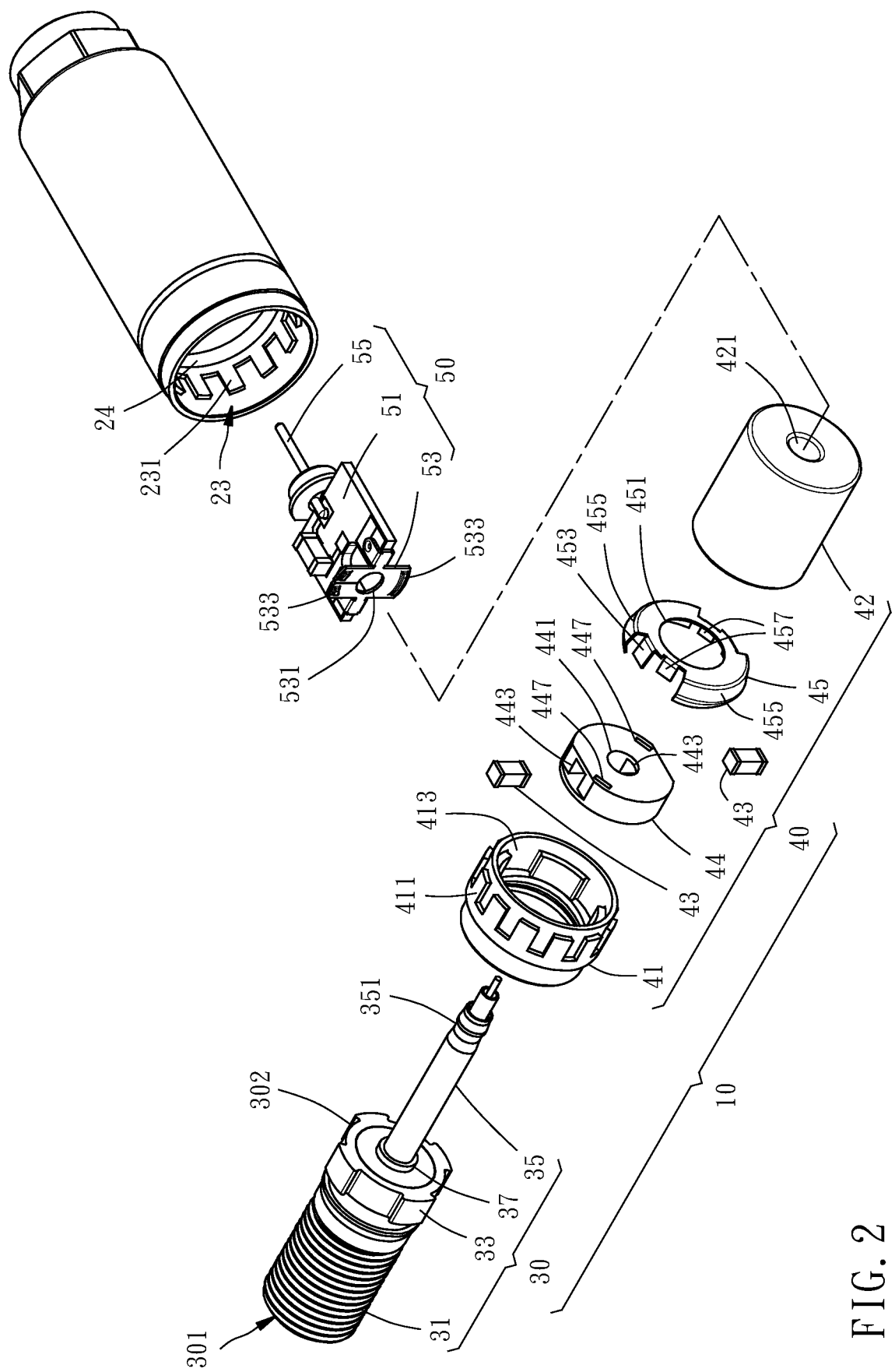
FIG. 2 is an exploded view based on FIG. 1.

Referring to FIG. 2, the signal protection module 40 comprises a tubular blocker 41, a ring inductor 42, two capacitors 43, a fitting element 44 and a conducting element 45.

A plurality of radially elevated tooth portions 411 is disposed on the outer wall of the tubular blocker 41. The tooth portions 411 are spaced apart. A plurality of engaging portions 413 is radially, concavely disposed on the inner wall of the tubular blocker 41. The engaging portions 413 correspond in position to the tooth portions 33 of the inner pipe 30. The tubular blocker 41 is made of plastic and thus blocks electrical interference.

The ring inductor 42 has an opening 421. Both the two capacitors 43 are multilayer ceramic capacitors, which have no polarity. The inductance level (or inductive reactance level) of the ring inductor 42 matches the capacitor level (or capacitive reactance level) of the two capacitors 43; hence, the signal protection module 40 effectively blocks out external noise and thereby prevents electrical harm otherwise caused to the other internal electronic components by external high-voltage surges.

The fitting element 44 is ring-shaped and thus has a penetrating hole 441. The fitting element 44 is made of plastic and thus blocks electrical interference. Two fitting holes 443 are penetratingly disposed in the fitting element 44. The two fitting holes 443 cross the penetrating hole 441 and are in communication with the penetrating hole 441. The two capacitors 43 are received in the two fitting holes 443 of the fitting element 44, respectively. An electrical end of one of the capacitors 43 is electrically connected to the metallic conducting rod 35 of the inner pipe 30. Two limiting portions 447 are concavely formed on the fitting element 44. The two limiting portions 447 cross the two fitting holes 441. The two fitting holes 443 of the fitting element 44 of the signal protection module 40 in the first preferred embodiment of the present disclosure open in the same axial direction which is perpendicular to the direction in which the penetrating hole 441 opens. The direction in which the two limiting portions 447 are concavely formed is the same as the direction in which the penetrating hole 441 opens. In a variant embodiment, only one fitting hole 443 is penetratingly disposed in the fitting element 44, and only one limiting portions 447 is concavely formed on the fitting element 44.

Figure 3:
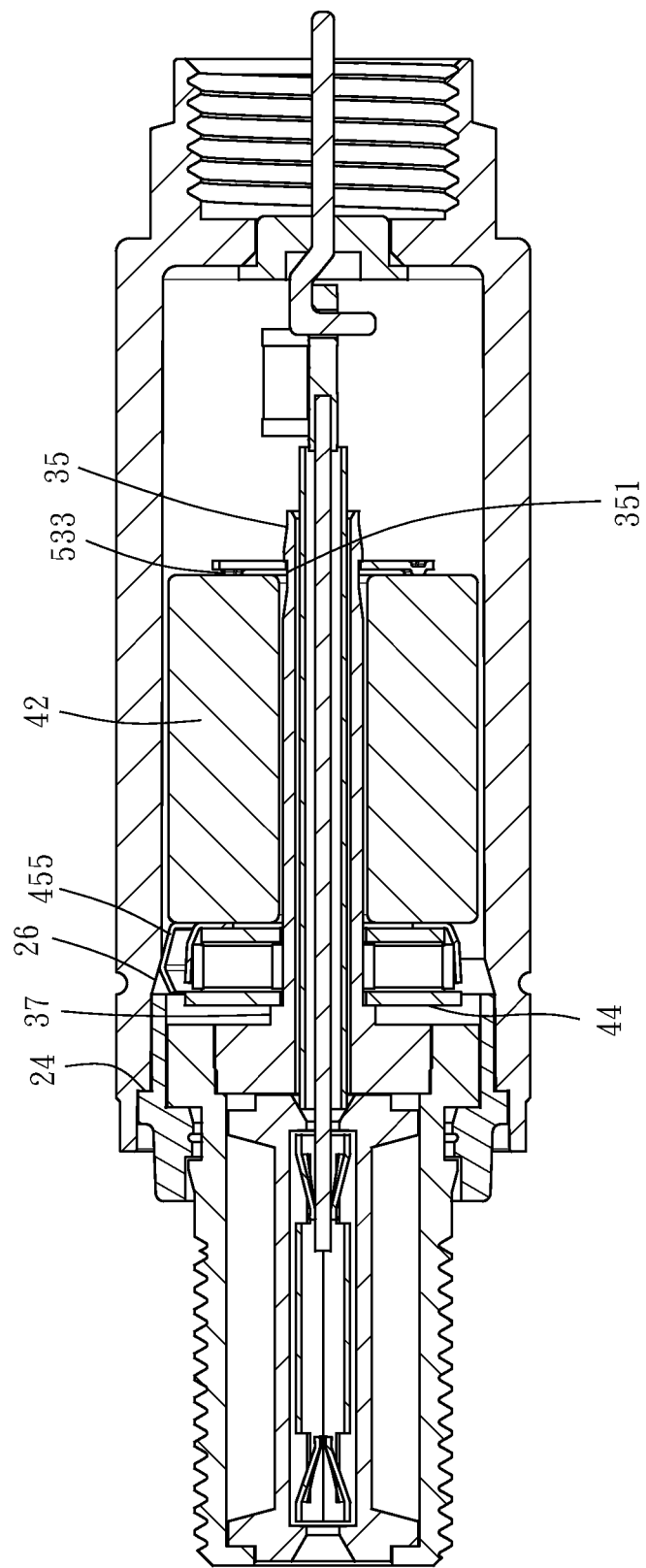
FIG. 3 is a cross-sectional view taken along line 3-3 of FIG. 1.
Figure 4:
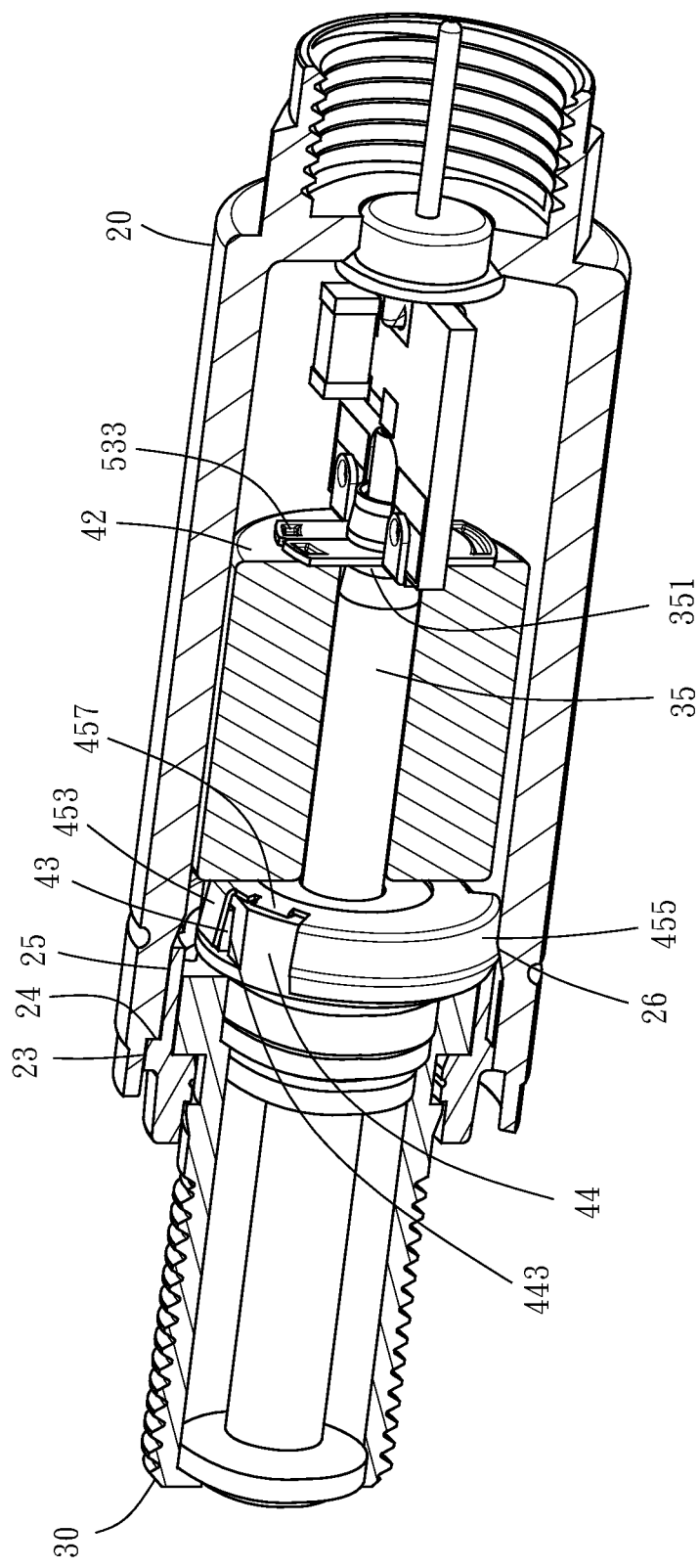
FIG. 4 is a cutaway view based on FIG. 1 and taken at another angle.

Referring to FIG. 2 through FIG. 4, the conducting element 45 is substantially a ring-shaped metallic conducting ring, has a penetrating hole 451, and corresponds in position to the penetrating hole 441 of the fitting element 44. The edge of the conducting element 45 extends in the direction of the second end 302 of the inner pipe 30 to form two pressing plates 453, two conducting plates 455 and two snap-engagement plates 457. The pressing plates 453, the conducting plates 455 and the snap-engagement plates 457 surround the penetrating hole 451 and are spaced apart. The conducting element 45 is disposed between one side of the ring inductor 42 and the fitting element 44; hence, the two pressing plates 453 of the conducting element 45 press against the other electrical ends of the two capacitors 43, respectively, and in consequence electrical connection is achieved between one side of the ring inductor 42 and the two capacitors 43 through the two pressing plates 453 of the conducting element 45. The two snap-engagement plates 457 of the conducting element 45 correspond in position to the two limiting portions 447 of the fitting element 44, respectively. One of the conducting plates 455 of the conducting element 45 abuts against the inner wall of the outer pipe 20 and thereby electrically connects thereto. Preferably, one of the conducting plates 455 of the conducting element 45 is confined to and abuts against the limiting portions 26 on the inner wall of the outer pipe 20. In a variant embodiment, the conducting element 45 extends to form only one pressing plate 453, only one conducting plate 455 and only one snap-engagement plate 457.

Referring to FIG. 2, the transmission member 50 comprises a circuit substrate 51, a conducting element 53 and a transmission element 55. The circuit substrate 51 is electrically connected to the conducting element 53 and the transmission element 55. The conducting element 53 is electrically connected to one side of the circuit substrate 51. The conducting element 53 is substantially C-shaped and thus forms a penetrating hole 531. The other side (corresponding in position to the circuit substrate 51) of the conducting element 53 extends to form five positioning walls 533. The positioning walls 533 are spaced apart. The conducting element 53 is resilient and forms only one positioning wall 533. The transmission element 55 is substantially a tubular metallic conducting core and electrically connects to the other side of the circuit substrate 51 to transmit signals outward.

Referring to FIG. 2 through FIG. 4, assembly of the signal protection device 10 and the cable connector 1 using the signal protection device 10 in accordance with the technical features disclosed in the first preferred embodiment of the present disclosure entails performing the steps of: fitting the tubular blocker 41 of the signal protection module 40 around the inner pipe 30 such that the engaging portions 413 of the tubular blocker 41 snap-engage with the tooth portions 33 of the inner pipe 30; fitting the penetrating hole 441 of the fitting element 44 of the signal protection module 40 around the metallic conducting rod 35 of the inner pipe 30 such that not only are electrical ends of the two capacitors 43, which are fitted into the two fitting holes 443 of the fitting element 44, electrically connected to the metallic conducting rod 35 of the inner pipe 30, but one side of the fitting element 44 also abuts against the annular wall 37 of the inner pipe 30 to therefore attain buffering; fitting the penetrating hole 451 of the conducting element 45 of signal protection module 40 around the metallic conducting rod 35 of the inner pipe 30 such that not only do the two pressing plates 453 of the conducting element 45 press against the other electrical end of the two capacitors 43, but the two snap-engagement plates 457 of the conducting element 45 are also snap-engaged with and thus fixed to the two limiting portions 447 of the fitting element 44, respectively; and fitting the opening 421 of the ring inductor 42 around the metallic conducting rod 35 of the inner pipe 30 such that one side of the ring inductor 42 electrically connects to the two capacitors 43 through the two pressing plates 453 of the conducting element 45.

Afterward, the inner pipe 30, together with the tubular blocker 41, the ring inductor 42, the fitting element 44 and the conducting element 45 of the signal protection module 40, are fitted into the first receiving portion 23 on the inner wall of the outer pipe 20 in the direction of the inner thread segment 21 such that the tooth portions 411 of the tubular blocker 41 of the signal protection module 40 snap-engage with the plurality of engaging segments 231 of the first receiving portion 23 of the outer pipe 20; hence, the tubular blocker 41 of the signal protection module 40 is stopped at the second receiving portion 25 of the outer pipe 20 and stopped by the shoulder portion 24 of the outer pipe 20. At this point, the metallic conducting rod 35 of the inner pipe 30 is disposed in the outer pipe 20 such that the outer thread segment 31 of the inner pipe 30 is exposed. Furthermore, one of the conducting plates 455 of the conducting element 45 of the signal protection module 40 abuts against and is confined to the limiting portions 26 of the inner wall of the outer pipe 20.

Then, the transmission member 50 is inserted into an end opening of the inner thread segment 21 of the outer pipe 20 such that the penetrating hole 531 of the conducting element 53 of the transmission member 50 fits around the metallic conducting rod 35 of the inner pipe 30 to not only attain electrical connection but also allow the transmission element 55 of the transmission member 50 to be exposed from the end opening of the inner thread segment 21 of the outer pipe 20. Preferably, the conducting element 53 of the transmission member 50 snap-engages with the snap-engagement portion 351 of the metallic conducting rod 35 of the inner pipe 30; hence, the positioning walls 533 of the conducting element 53 of the transmission member 50 tightly abut against the other side of the ring inductor 42 of the signal protection module 40, allowing signals to be transmitted outward through the transmission element 55 of the transmission member 50.

In conclusion, advantages of the technical features of the signal protection device 10 disposed at a cable, its constituent elements, and the assembly process thereof, as disclosed in the first preferred embodiment of the present disclosure are as follows:

First, the signal protection device 10 is modularized and miniaturized. Referring to FIG. 2 through FIG. 4, the outer pipe 20 of the signal protection device 10 of the present disclosure does have a limited capacity in practice. The signal protection device 10 is modularized and miniaturized to therefore effectively increase the highest tolerance level of noise to be blocked out despite the limited capacity. In case of interference, such as external noise and high-voltage surges, there is electrical conduction from the outer thread segment 31 of the inner pipe 30 to any said capacitor 43 in the fitting element 44 of the signal protection module 40 electrically connected to the metallic conducting rod 35, and then there is electrical conduction from any said conducting plate 455 of the conducting element 45 to the inner wall of the outer pipe 20. Therefore, the modularized signal protection module 40 and constituent elements thereof effectively suppress interference, such as external noise and high-voltage surges.

Second, the signal protection device 10 has dual protection mechanisms. Referring to FIG. 3 and FIG. 4, in case of interference, such as external noise and high-voltage surges, not only is there electrical conduction from the outer surface of the metallic conducting rod 35 of the inner pipe 30 to any said capacitor 43 in the fitting element 44 of the signal protection module 40, but there is also electrical conduction from any said conducting plate 455 of the conducting element 45 of the signal protection module 40 to the inner wall of the outer pipe 20. Therefore, the signal protection device 10 not only effectively suppresses interference, such as external noise and high-voltage surges, and thereby protects the transmission element 55 and the circuit substrate 51 of the transmission member 50 against damage, but also has dual protection mechanisms provided by the signal protection module 40 to therefore enhance the suppression of interference, such as external noise and high-voltage surges.

Third, the signal protection device 10 is conducive to fixation and prevention of disconnection. Referring to FIG. 3 and FIG. 4, after the transmission member 50, the inner pipe 30, the signal protection module 40, and the outer pipe 20 of the signal protection device 10 have been put together, the outer pipe 20 deforms radially in the direction from the outer wall of the first receiving portion 23 to the outer thread segment 31 of the inner pipe 30 until it engages with the tubular blocker 41 of the signal protection module 40. Therefore, the inner pipe 30 and the signal protection module 40 are placed in place and thus prevented from falling off.

Figure 5:
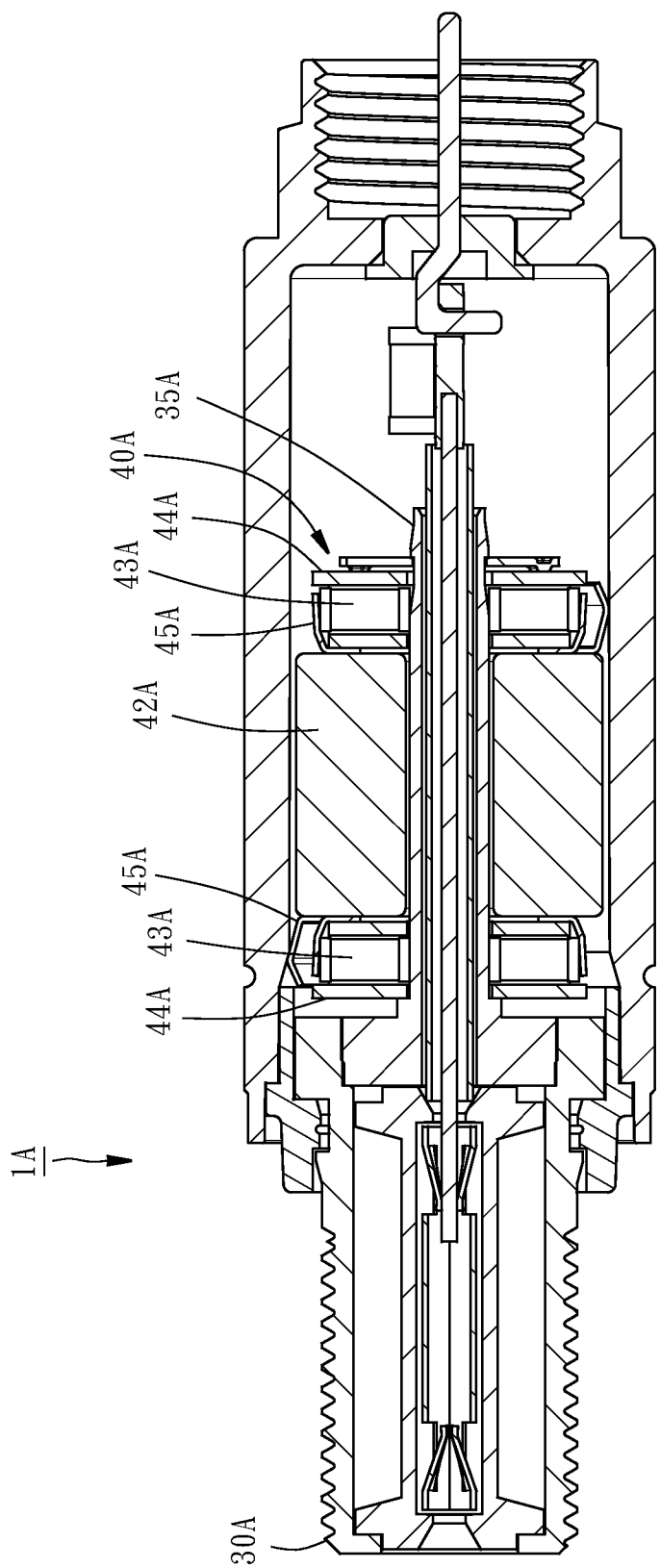
FIG. 5 is a cross-sectional view of the second preferred embodiment of the present disclosure.

Referring to FIG. 5, there is shown a cross-sectional view of another cable connector 1A disposed at a cable according to the second preferred embodiment of the present disclosure. The cable connector 1A in the second preferred embodiment is substantially identical to the cable connector 1 in the first preferred embodiment except for its distinguishing technical features described below. In the second preferred embodiment, the fitting elements 44A and the conducting elements 45A of the signal protection module 40A are in the number of two. The other fitting element 44A and the other conducting element 45A are fitted to the other side of the ring inductor 42A and face away from the fitting element 44A and the conducting element 45A. Likewise, the fitting elements 44A are receivedly disposed at the two capacitors 43A, respectively. An electrical end of each capacitor 43A is electrically connected to the metallic conducting rod 35A of the inner pipe 30A.

Figure 6:
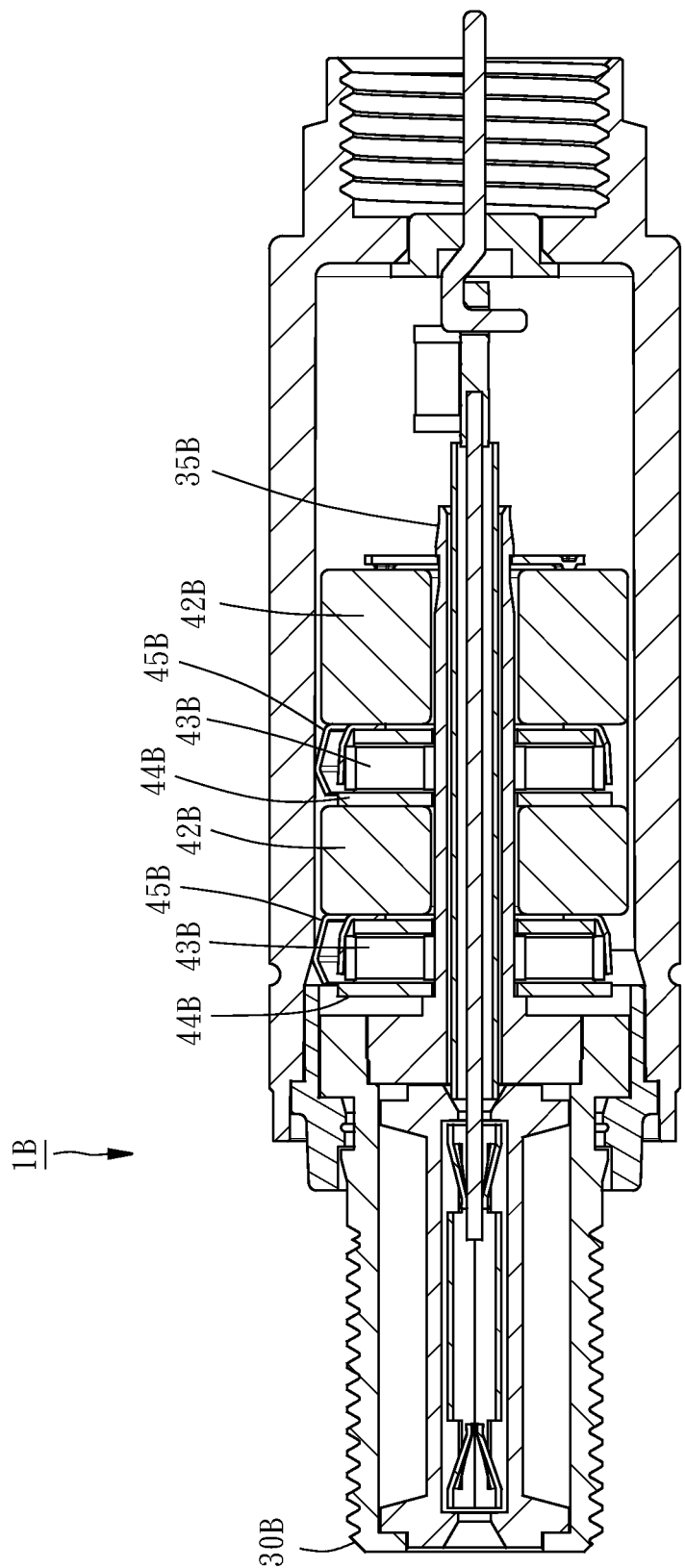
FIG. 6 is a cross-sectional view of the third preferred embodiment of the present disclosure.

Referring to FIG. 6, there is shown a cross-sectional view of yet another cable connector 1B disposed at a cable according to the third preferred embodiment of the present disclosure. The cable connector 1B in the third preferred embodiment is substantially identical to the cable connectors 1, 1A in the first and second preferred embodiments except for its distinguishing technical features described below. In the third preferred embodiment, the signal protection modules 40B are in the number of two and sequentially fitted to the metallic conducting rod 35B of the inner pipe 30B such that the ring inductor 42B, the fitting element 44B and the conducting element 45B of each signal protection module 40B are spaced apart. Likewise, the fitting elements 44B of the signal protection modules 40B are receivedly disposed at the two capacitors 43B, respectively. An electrical end of each capacitor 43B is electrically connected to the metallic conducting rod 35B of the inner pipe 30B.

Figure 7:
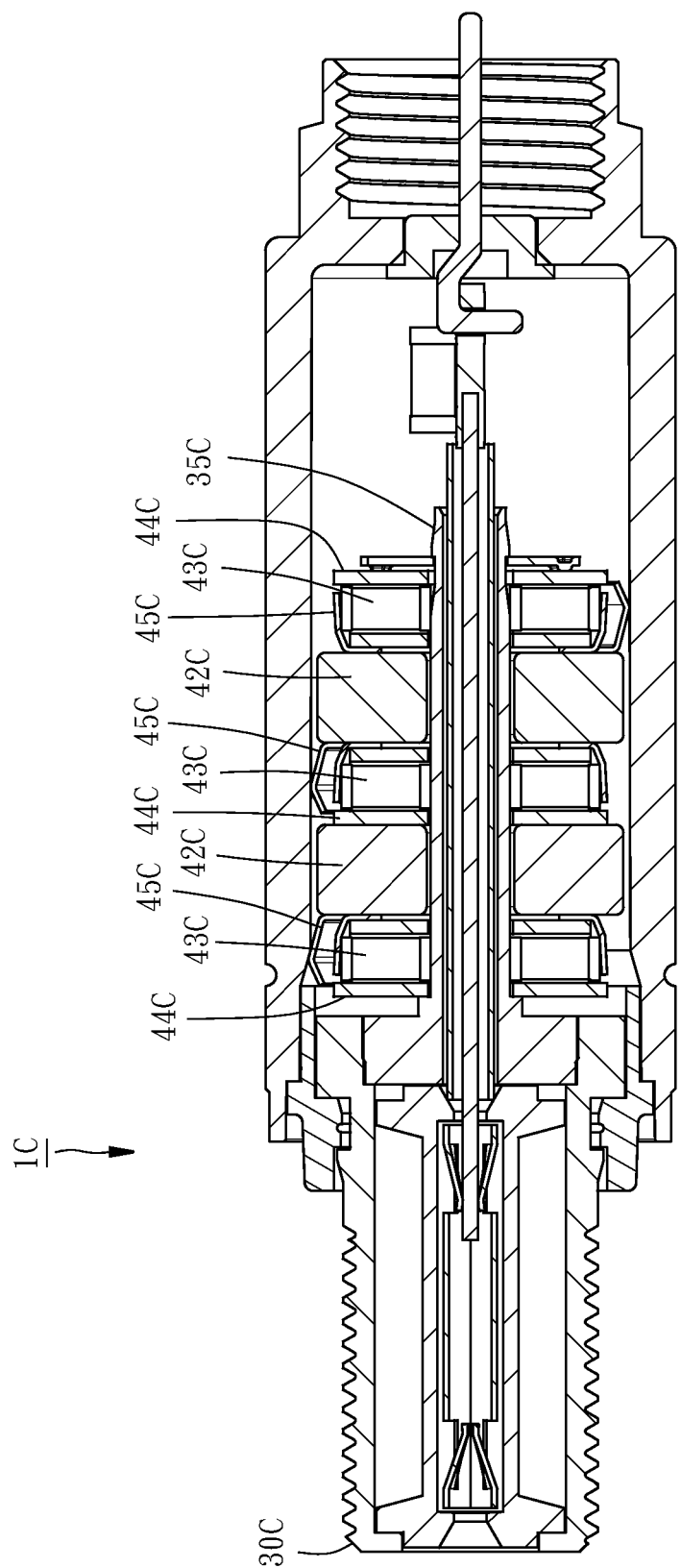
FIG. 7 is a cross-sectional view of the fourth preferred embodiment of the present disclosure.

Referring to FIG. 7, there is shown a cross-sectional view of a further cable connector 1C disposed at a cable according to the fourth preferred embodiment of the present disclosure. The cable connector 1C in the fourth preferred embodiment is substantially identical to the cable connectors 1, 1A, 1B in the first, second and third preferred embodiments except for its distinguishing technical features described below. In the fourth preferred embodiment, the signal protection modules 40C are in the number of two. The other fitting element 44C and the other conducting element 45C are fitted to the other side of the other ring inductor 42C. The signal protection modules 40C are sequentially fitted to the metallic conducting rod 35C of the inner pipe 30C. The ring inductor 42C, the fitting element 44C and the conducting element 45C of each signal protection module 40C are spaced apart. Likewise, the fitting elements 44C of the signal protection modules 40C are receivedly disposed at the two capacitors 43C, respectively. An electrical end of each capacitor 43C is electrically connected to the metallic conducting rod 35C of the inner pipe 30C.

The advantages of the technical features of the constituent elements in the second, third and fourth preferred embodiments are as follows: different capacitor levels (or capacitive reactance levels) are selected according to different predetermined inductance levels (or inductive reactance levels) of finished products, and then at least one or a plurality of ring inductors is selected according to the resultant predetermined frequency point and tolerance level of noise to be blocked out, so as to not only effectively enhance applicability of assembly but also meet the need for customization.

Last but not least, persons skilled in the art definitely understand that the aforesaid detailed descriptions and embodiments are merely applicable to the explanations of structures, methods, process flows and intended advantages of the present disclosure rather than restrictive of the claims of the present disclosure; hence, the other equivalent elements as well as substitutes for or changes to components, objectives, structures, devices, methods, or process flows must also fall within the scope of the claims of the present disclosure.

What is claimed is:

1. A signal protection device, comprising:
an inner pipe having a first end, a second end opposing the first end and having a closed surface, and an outer thread segment disposed on an outer wall of the inner pipe and positioned proximate to the first end, wherein a center and a rim of the closed surface of the second end of the inner pipe extend to form a metallic conducting rod; and
a signal protection module comprising a tubular blocker, a ring inductor, at least one capacitor, a fitting element and a conducting element, wherein the ring inductor, the fitting element and the conducting element each fit to the metallic conducting rod of the inner pipe;
wherein a plurality of engaging portions is radially, concavely disposed on an inner wall of the tubular blocker and snap-engaged with the inner pipe;
wherein a penetrating hole and at least one fitting hole are disposed at the fitting element, the penetrating hole is fitted around the metallic conducting rod of the inner pipe, the at least one fitting hole is in communication with the penetrating hole and the metallic conducting rod of the inner pipe, with the at least one capacitor receivedly disposed in the at least one fitting hole of the fitting element and electrically connected to the metallic conducting rod of the inner pipe;
wherein the conducting element is a metallic conducting ring disposed between a side of the ring inductor and the fitting element and has at least one pressing plates extending therefrom and at least one conducting plates extending therefrom, wherein a penetrating hole is penetratingly disposed at the conducting element and corresponds in position to a penetrating hole of the fitting element, wherein the at least one pressing plate of the conducting element presses against another side of the at least one capacitor receivedly disposed in the at least one fitting hole of the fitting element such that the ring inductor electrically connected to the conducting element.

2. The signal protection device of claim 1, wherein a plurality of radially elevated tooth portions is disposed on an outer wall of the inner pipe, positioned proximate to the second end, spaced apart, and adapted to snap-engage with the engaging portions of the tubular blocker of the signal protection module.

3. The signal protection device of claim 2, wherein a closed surface of the second end of the inner pipe extends to form an annular wall disposed around the metallic conducting rod, and a side of the annular wall is tightly attached to the fitting element of the signal protection module.

4. The signal protection device of claim 1, wherein a closed surface of the second end of the inner pipe extends to form an annular wall disposed around the metallic conducting rod, and a side of the annular wall is tightly attached to the fitting element of the signal protection module.

5. The signal protection device of claim 1, wherein a direction in which the at least one fitting hole of the fitting element opens crosses a direction in which the penetrating hole opens.

6. The signal protection device of claim 2, wherein a direction in which the at least one fitting hole of the fitting element opens crosses a direction in which the penetrating hole opens.

7. The signal protection device of claim 3, wherein a direction in which the at least one fitting hole of the fitting element opens crosses a direction in which the penetrating hole opens.

8. The signal protection device of claim 4, wherein a direction in which the at least one fitting hole of the fitting element opens crosses a direction in which the penetrating hole opens.

9. A cable connector, comprising:
a signal protection device of claim 1; and
an outer pipe, wherein an inner thread segment is disposed on an inner wall at an end of the outer pipe, a first receiving portion and a second receiving portion are radially, concavely disposed on an inner wall at another end of the outer pipe, wherein the first receiving portion is of a greater radial dimension than the second receiving portion, allowing a shoulder portion to be formed, wherein the outer pipe tapers from the second receiving portion to the inner thread segment to form a limiting portion which tapers;

wherein the inner pipe is inserted in a direction from the first receiving portion of the outer pipe to the inner thread segment such that the metallic conducting rod of the inner pipe is disposed in the outer pipe, allowing a tubular blocker of the signal protection module to be snap-engaged with the first receiving portion of the outer pipe, stopped at the second receiving portion of the outer pipe, and blocked by the shoulder portion of the outer pipe, wherein the at least one conducting plate of the conducting element of the signal protection module abuts against and is confined to the limiting portion on the inner wall of the outer pipe.

10. The cable connector of claim 9, further comprising a transmission member inserted in a direction from the inner thread segment of the outer pipe to the first receiving portion, the transmission member comprising a circuit substrate, a resilient conducting element and a transmission element, the circuit substrate being electrically connected to the conducting element and the transmission element, the conducting element being electrically connected to a side of the circuit substrate and having a penetrating hole fitting around the metallic conducting rod of the inner pipe of the signal protection module, wherein another side of the conducting element, which corresponds in position to the circuit substrate, extends to form at least one positioning wall abutting against another side of a ring inductor of the signal protection module.

11. The cable connector of claim 10, wherein a snap-engagement portion is radially, concavely formed around the metallic conducting rod of the inner pipe, positioned proximate to a free end of the metallic conducting rod, and snap-engaged with the conducting element of the transmission member such that the at least one positioning wall of the conducting element of the transmission member tightly abuts against another side of the ring inductor of the signal protection module.

12. The cable connector of claim 11, wherein an inner wall of the first receiving portion of the outer pipe deforms radially in a direction of an outer thread segment of the inner pipe until it engages with the tubular blocker of the signal protection module of the signal protection device.

13. The cable connector of claim 12, wherein an inner wall of the first receiving portion of the outer pipe has a plurality of engaging segments radially extending and spaced apart, and a plurality of radially-elevated, spaced-apart tooth portions is disposed on the outer wall of the tubular blocker of the signal protection module of the signal protection device, wherein the tooth portions of the tubular blocker of the signal protection module snap-engage with the plurality of engaging segments of the first receiving portion of the outer pipe as soon as the inner pipe is inserted in a direction from the first receiving portion on the inner wall of the outer pipe to the inner thread segment.

14. A cable connector, comprising:
a signal protection device of claim 2; and
an outer pipe, wherein an inner thread segment is disposed on an inner wall at an end of the outer pipe, a first receiving portion and a second receiving portion are radially, concavely disposed on an inner wall at another end of the outer pipe, wherein the first receiving portion is of a greater radial dimension than the second receiving portion, allowing a shoulder portion to be formed, wherein the outer pipe tapers from the second receiving portion to the inner thread segment to form a limiting portion which tapers;

wherein the inner pipe is inserted in a direction from the first receiving portion of the outer pipe to the inner thread segment such that the metallic conducting rod of the inner pipe is disposed in the outer pipe, allowing a tubular blocker of the signal protection module to be snap-engaged with the first receiving portion of the outer pipe, stopped at the second receiving portion of the outer pipe, and blocked by the shoulder portion of the outer pipe, wherein the at least one conducting plate of the conducting element of the signal protection module abuts against and is confined to the limiting portion on the inner wall of the outer pipe.

15. The cable connector of claim 14, further comprising a transmission member inserted in a direction from the inner thread segment of the outer pipe to the first receiving portion, the transmission member comprising a circuit substrate, a resilient conducting element and a transmission element, the circuit substrate being electrically connected to the conducting element and the transmission element, the conducting element being electrically connected to a side of the circuit substrate and having a penetrating hole fitting around the metallic conducting rod of the inner pipe of the signal protection module, wherein another side of the conducting element, which corresponds in position to the circuit substrate, extends to form at least one positioning wall abutting against another side of a ring inductor of the signal protection module.

16. The cable connector of claim 15, wherein a snap-engagement portion is radially, concavely formed around the metallic conducting rod of the inner pipe, positioned proximate to a free end of the metallic conducting rod, and snap-engaged with the conducting element of the transmission member such that the at least one positioning wall of the conducting element of the transmission member tightly abuts against another side of the ring inductor of the signal protection module.

17. The cable connector of claim 16, wherein an inner wall of the first receiving portion of the outer pipe deforms radially in a direction of an outer thread segment of the inner pipe until it engages with the tubular blocker of the signal protection module of the signal protection device.

18. The cable connector of claim 17, wherein an inner wall of the first receiving portion of the outer pipe has a plurality of engaging segments radially extending and spaced apart, and a plurality of radially-elevated, spaced-apart tooth portions is disposed on the outer wall of the tubular blocker of the signal protection module of the signal protection device, wherein the tooth portions of the tubular blocker of the signal protection module snap-engage with the plurality of engaging segments of the first receiving portion of the outer pipe as soon as the inner pipe is inserted in a direction from the first receiving portion on the inner wall of the outer pipe to the inner thread segment.

* * * * *